United States Patent
Araki

(10) Patent No.: US 10,635,919 B2
(45) Date of Patent: Apr. 28, 2020

(54) INFORMATION PROCESSING DEVICE, IMAGE PROCESSING SYSTEM, IMAGE PROCESSING METHOD, AND PROGRAM STORAGE MEDIUM

(71) Applicant: NEC CORPORATION, Tokyo (JP)

(72) Inventor: Kenta Araki, Tokyo (JP)

(73) Assignee: NEC CORPORATION, Minato-ku, Tokyo (JP)

( * ) Notice: Subject to any disclaimer, the term of this patent is extended or adjusted under 35 U.S.C. 154(b) by 0 days.

(21) Appl. No.: 16/372,912

(22) Filed: Apr. 2, 2019

(65) Prior Publication Data

US 2019/0228249 A1   Jul. 25, 2019

Related U.S. Application Data

(63) Continuation of application No. 15/766,613, filed as application No. PCT/JP2016/004471 on Oct. 4, 2016.

(30) Foreign Application Priority Data

Oct. 7, 2015   (JP) ................................. 2015-199081

(51) Int. Cl.
*G06K 9/03*   (2006.01)
*G06T 7/73*   (2017.01)
(Continued)

(52) U.S. Cl.
CPC .................. *G06K 9/03* (2013.01); *G06T 7/70* (2017.01); *G06T 7/74* (2017.01); *G06T 7/77* (2017.01);
(Continued)

(58) Field of Classification Search
CPC combination set(s) only.
See application file for complete search history.

(56) References Cited

U.S. PATENT DOCUMENTS

| 2006/0021027 A1* | 1/2006 | Saito | H04N 1/00249 726/18 |
|---|---|---|---|
| 2009/0009651 A1* | 1/2009 | Takayanagi | G03B 13/36 348/345 |

(Continued)

FOREIGN PATENT DOCUMENTS

| JP | 2011-165170 A | 8/2011 |
|---|---|---|
| JP | 2012-190262 A | 10/2012 |

OTHER PUBLICATIONS

International Search Report for PCT/JP2016/004471 dated Dec. 13, 2016 [PCT/ISA/210].

(Continued)

*Primary Examiner* — Zhiyu Lu
(74) *Attorney, Agent, or Firm* — Sughrue Mion, PLLC

(57) ABSTRACT

The purpose of the present invention is, when a portion of a subject to be detected is occluded, to simplify detecting that the occluded subject to be detected is the subject to be detected, regardless of the position which is occluded. Provided is an information processing device (110), comprising: a computation unit (111) which computes local scores for each of a plurality of positions which are contained in an image of a prescribed scope, said scores indicating the likelihood of an object to be detected being present; and a change unit (112) which changes the scores for the positions, among the plurality of positions, which are included in a prescribed region which is determined according to the plurality of scores which have been computed for said plurality of positions, such that the likelihood of the object to be detected being present increases.

12 Claims, 8 Drawing Sheets

(51) Int. Cl.
  *G06T 7/77*  (2017.01)
  *G06T 7/70*  (2017.01)
  *G06K 9/46*  (2006.01)

(52) U.S. Cl.
  CPC ...... *G06K 9/46* (2013.01); *G06T 2207/20076* (2013.01); *G06T 2207/30201* (2013.01)

(56) References Cited

U.S. PATENT DOCUMENTS

| | | | | |
|---|---|---|---|---|
| 2009/0091798 A1* | 4/2009 | Lawther | ............... | G06F 16/58 358/3.28 |
| 2009/0161964 A1* | 6/2009 | Tzur | ............... | G06K 9/3208 382/203 |
| 2009/0175512 A1* | 7/2009 | Hyuga | ............... | G06K 9/00288 382/118 |
| 2010/0177206 A1* | 7/2010 | Ogawa | ............... | G06K 9/00275 348/222.1 |
| 2010/0296697 A1* | 11/2010 | Ikenoue | ............... | H04N 7/18 382/103 |
| 2011/0229025 A1* | 9/2011 | Zhao | ............... | G06K 9/4671 382/165 |
| 2013/0259307 A1* | 10/2013 | Torii | ............... | G06K 9/00624 382/103 |

OTHER PUBLICATIONS

Written Opinion for PCT/JP2016/004471 dated Dec. 13, 2016 [PCT/ISA/237].

* cited by examiner

INFORMATION PROCESSING DEVICE, IMAGE PROCESSING SYSTEM, IMAGE PROCESSING METHOD, AND PROGRAM STORAGE MEDIUM

CROSS REFERENCE TO RELATED APPLICATIONS

This application is a Continuation of U.S. application Ser. No. 15/766,613, filed Apr. 6, 2018, which is a National Stage of International Application No. PCT/JP2016/004471, filed on Oct. 4, 2016, which claims priority from Japanese Patent Application No. 2015-199081, filed on Oct. 7, 2015.

TECHNICAL FIELD

The present invention relates to image processing, and in particular to detection of an object.

BACKGROUND ART

In object detection, detection accuracy generally deteriorates when a covering object is present on a detection target. In image processing, such covering is also referred to as occlusion. As a technique for coping with occlusion, there is, for example, a technique described in PTL 1. The technique described in PTL 1 previously sets a hidden region, thereby reducing contribution of a feature value of the hidden region (e.g., see paragraph 0009, FIGS. 8 to 11).

CITATION LIST

Patent Literature

[PTL 1] Japanese Unexamined Patent Application Publication No. 2012-190262

SUMMARY OF INVENTION

Technical Problem

Covering of a detection target does not always occur at a similar position. When the technique described in PTL 1 is used, there is an increased possibility that a detection target (a face in PTL 1) is determined not to be included even when the detection target is included in an image, unless a correspondence between a hidden region and a covering object, in other words, setting of a hidden region is appropriate.

One exemplary purpose of the present invention is to provide a technique for facilitating, when a part of a detection target is covered, detection that the covered detection target is a detection target, regardless of a covered position thereof.

Solution to Problem

In one aspect, the present invention provides an information processing device comprising: computation means for computing local scores each indicating likelihood of a detection target, for a plurality of positions included in an image within a predetermined range; and change means for changing one or more scores of one or more positions among the plurality of positions in such a way that the likelihood of the detection target increases, the one or more positions included in a prescribed region determined depending on a plurality of computed scores.

In another aspect, the present invention provides an image processing system comprising: computation means for computing local scores each indicating likelihood of a detection target, for a plurality of positions included in an image within a predetermined range; change means for changing one or more scores of one or more positions among the plurality of positions in such a way that the likelihood of the detection target increases, the one or more positions included in a prescribed region determined depending on a plurality of computed scores; and object detection means for detecting the detection target based on the computed scores and the changed one or more scores.

In another aspect, the present invention provides an image processing method comprising: computing local scores each indicating likelihood of a detection target, for a plurality of positions included in an image within a predetermined range; and changing one or more scores of one or more positions among the plurality of positions in such a way that the likelihood of the detection target increases, the one or more positions included in a prescribed region determined depending on a plurality of computed scores.

In another aspect, the present invention provides a computer-readable program storage medium storing a program for causing a computer to execute: processing of computing local scores each indicating likelihood of a detection target, for a plurality of positions included in an image within a predetermined range; and processing of changing one or more scores of one or more positions among the plurality of positions in such a way that the likelihood of the detection target increases, the one or more positions included in a prescribed region determined depending on a plurality of computed scores.

Advantageous Effects of Invention

According to the present invention, it is possible to facilitate, when a part of a detection target is covered, detection that the covered detection target is a detection target, regardless of a covered position thereof.

DESCRIPTION OF EMBODIMENTS

First Example Embodiment

Figure 1:
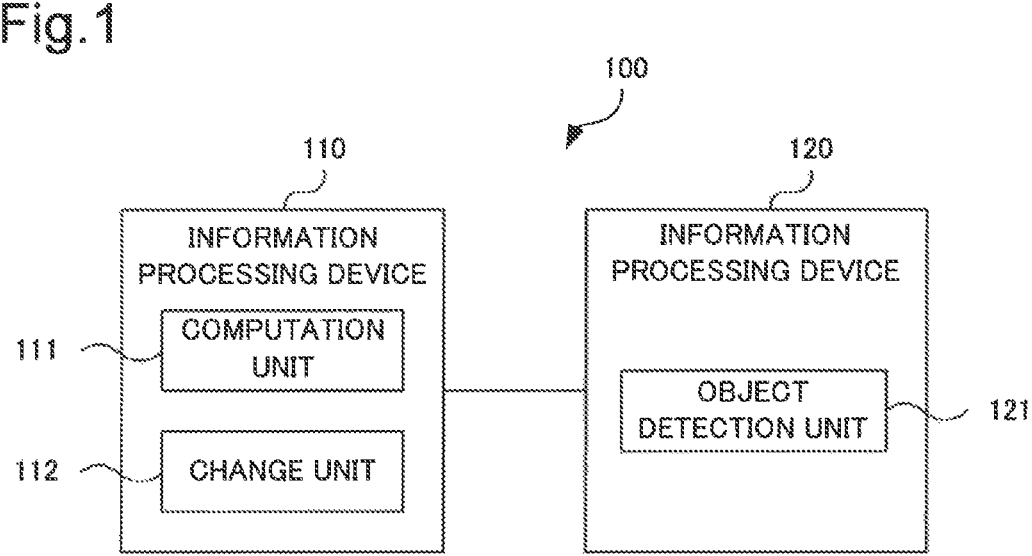
FIG. 1 is a block diagram illustrating one example of a configuration of an image processing system.

FIG. 1 is a block diagram illustrating a configuration of an image processing system 100 according to one example embodiment of the present invention. The image processing system 100 is an information processing system for detecting a detection target from an image. A detection target needs only to be an object having a certain tendency or a characteristic, and is not limited to a particular object. Hereinafter, a detection target will be briefly referred to as a "target". A target is, for example, a human body or its part (a face, a hand, and the like), an animal, a building, a vehicle, a sign, or the like.

The image processing system 100 includes information processing devices 110 and 120. The information processing devices 110 and 120 are dedicated or general-purpose computer devices, and are, for example, server devices or personal computers. The information processing devices 110 and 120 are configured to be able to communicate with each other. A communication method of the information processing devices 110 and 120 is not limited to a particular method, and may be performed via some other device.

The information processing device 110 includes a computation unit 111 and a change unit 112. The information processing device 120 includes an object detection unit 121.

The computation unit 111 computes a score indicating likelihood of a target regarding an image. Likelihood of a target refers to a degree at which a characteristic present in the target appears in an image, and is also referred to as likelihood. The computation unit 111 computes local scores for a plurality of positions in an image, respectively. For example, the computation unit 111 computes a score on the basis of a local feature value of an image. An algorithm for computing a local feature value is not limited to a particular algorithm.

The computation unit 111 may acquire image data and compute a score. In this case, the computation unit 111 computes a score after computing a local feature value on the basis of the acquired image data. Alternatively, the computation unit 111 may acquire data indicating local feature values of a plurality of positions in an image and compute a score. In this case, computation of a local feature value needs only to be performed by a device or a circuit provided at a former stage of the computation unit 111.

The computation unit 111 computes a score for a predetermined range of an image. This range may be a part of an image or the whole image. For example, the computation unit 111 may set, in an image, a detection window (search window) whose shape is based on a target, and compute a score at a prescribed position in the detection window. In this case, while changing a position and/or a size of a detection window in an image, the computation unit 111 can compute a score for each position and/or each size.

A position in an image at which the computation unit 111 computes a score will hereinafter be also referred to as a "computation point". A position of a computation point and a number of computation points are not limited to particular ones. However, in order to detect a target from an image, a certain number of computation points need to be present in an image.

The change unit 112 changes some of scores computed by the computation unit 111. When a distribution of scores in an image satisfies a predetermined condition (first condition), the change unit 112 changes at least one of scores of computation points satisfying a predetermined condition (second condition). The first condition and the second condition can also be referred to as a positional condition (of a computation point) and a numerical condition (of a score), respectively.

Briefly speaking, the change unit 112 changes a score of a computation point included in a prescribed region which has a high possibility of being a region where a part of a target is covered among a plurality of computation points, in such a way that likelihood of the target increases. In this instance, the change unit 112 changes a score which satisfies the conditions described above and which has been determined to be low in likelihood of the target, in such a way that likelihood of the target increases. A plurality of methods for specifying the prescribed region referred to herein are conceivable, and the following method may be taken, for example.

The change unit 112 divides an image for which the detection is performed into a plurality of regions (i.e. two or more regions) on the basis of a score computed by the computation unit 111, and changes a score of a computation point included in one of the plurality of regions. For example, the change unit 112 divides an image for which the detection is performed into two kinds of regions, that is, a "region where low scores are gathered (hereinafter referred to as a "first region")" and a "region where high scores are gathered (hereinafter referred to as a "second region")", and changes a score computed in the first region.

Specifically, for example, when an average value of scores of computation points included in a predetermined range is less than or equal to a predetermined threshold and when there are a certain number (or a certain rate) or more of computation points which are included in the range and whose scores are less than or equal to the threshold, the change unit 112 changes a score of a computation point whose score is less than or equal to the threshold. In this case, instead of changing all scores of computation points whose scores are less than or equal to the predetermined threshold, the change unit 112 may selectively change only scores of such computation points around which there are to some extent computation points associated with similar scores.

After changing the score computed by the computation unit 111, the change unit 112 outputs a score. The change unit 112 not only outputs the changed score but also outputs a score which do not satisfy the predetermined condition and has therefore not been changed. In other words, the scores which do not satisfy the predetermined condition pass through the change unit 112 without any change.

The object detection unit 121 acquires a score from the information processing device 110, and detects a target on the basis of the acquired score. In other words, the object detection unit 121 detects whether a target is present or not on the basis of the acquired score. The object detection unit 121 also performs processing which depends on a result of detection of the target. For example, the object detection unit 121 may output data indicating whether or not a target has been detected. Alternatively, the object detection unit 121 may perform image processing using a result of detection of the target.

Figure 2:
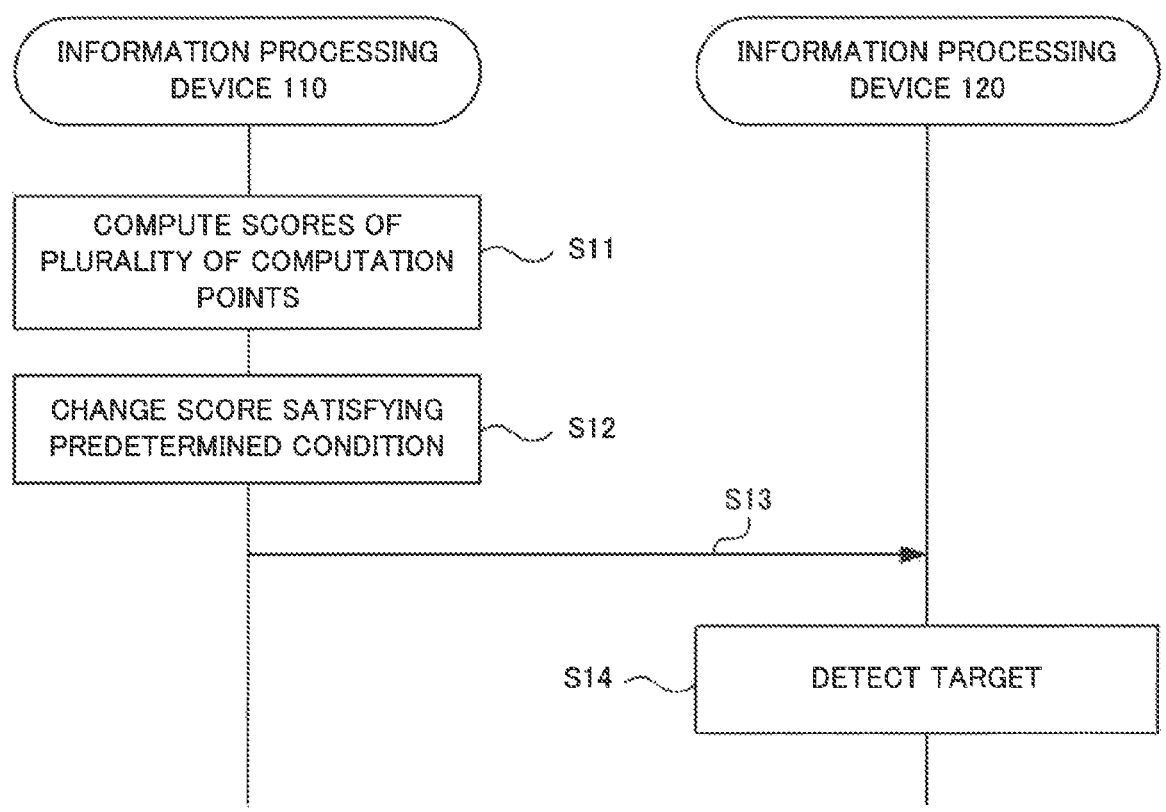
FIG. 2 is a sequence chart illustrating one example of an operation in the image processing system.

FIG. 2 is a sequence chart illustrating on overview of an operation in the image processing system 100. First, the information processing device 110 computes scores of a plurality of computation points, respectively (step S11). Then, the information processing device 110 changes one or more scores satisfying the predetermined condition, among the scores computed in step S11 (step S12). The information processing device 110 supplies the scores to the information processing device 120 (step S13).

When acquiring the scores from the information processing device 110, the information processing device 120 attempts detection of a target (step S14). The information processing device 120 determines whether or not a target is included in an image for which a detection is performed, on the basis of the scores of the plurality of computation points. Thereafter, the information processing device 120 performs processing which depends on a determination result. The processing performed in this phase is not limited to a particular processing.

The image processing system 100 may perform the processing illustrated in FIG. 2 a plurality of times for one image. As described above, the image processing system 100 may repeatedly perform the processing illustrated in FIG. 2 while changing a position or a size of a detection window. The image processing system 100 may repeatedly perform the processing illustrated in FIG. 2 while changing a position of a computation point and the number of computation points.

For example, when performing the processing illustrated in FIG. 2 n times for one image, the image processing system 100 may repeat a series of the processing illustrated in FIG. 2 n times. Alternatively, the image processing system 100 may perform the processing in steps S11 and S12 n times in the information processing device 110, and collectively supply scores for n times to the information processing device 120 in step S13. In such a case, the information processing device 120 performs the processing in step S14 n times collectively after acquiring a score.

According to the image processing system 100 described above, it is possible to increase a possibility that a target is determined to be a target when a part of the target is covered. Since the image processing system 100 is configured to change a score in a prescribed region determined on the basis of scores at a plurality of computation points, it is not necessary to previously set a position where a target is covered, at a time of changing a score. In other words, the image processing system 100 can make it easier to detect a covered target as a target, without previously setting a position at which the target would be hidden behind.

Second Example Embodiment

Figure 3:
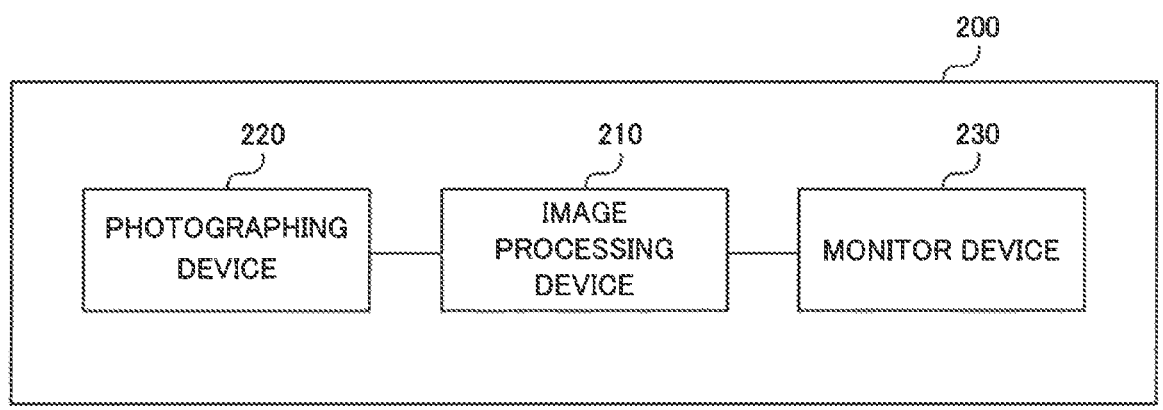
FIG. 3 is a block diagram illustrating another example of a configuration of an image processing system.

FIG. 3 is a block diagram illustrating a configuration of an image processing system 200 according to another example embodiment of the present invention. The image processing system 200 is an information processing system for detecting a human face from an image. In other words, a target in the present example embodiment is a human face. The face referred to herein does not need to be a face of a particular person. The image processing system 200 detects, from an image, a region having a general characteristic with which a target can be regarded as a human face.

The image processing system 200 includes an image processing device 210, a photographing device 220, and a monitor device 230. The image processing device 210, the photographing device 220, and the monitor device 230 are communicably connected with each other. These devices may be connected via a network such as the Internet, but may be directly connected without a network or some other device therebetween. At least one of these devices may be achieved by a plurality of devices. For example, the image processing system 200 may have a configuration in which a plurality of photographing devices 220 are connected to one image processing device 210. The image processing device 210 may be configured as a part of the photographing device 220 or the monitor device 230.

The photographing device 220 is, for example, a surveillance camera. The photographing device 220 is provided, for example, in a predetermined facility or on a street, and transmits image data to the image processing device 210. The photographing device 220 may be installed in a manned or unmanned moving body (e.g., an automobile or a drone). The number of colors (monochrome or color), the number of pixels, a data format, and the like of image data are not limited to particular ones. The image referred to herein may be a part of a moving image (e.g., an image of a frame).

The image processing device 210 detects a human face on the basis of image data received from the photographing device 220. The image processing device 210 computes a local feature value from image data, and detects a human face by a classifier using what is called boosting. The image processing device 210 transmits data (e.g. image data) which depends on a detection result to the monitor device 230.

The monitor device 230 is, for example, a display device for displaying an image. The monitor device 230 may perform additional image processing on the basis of detection of a person by the image processing device 210. Moreover, the monitor device 230 may record the image data transmitted from the image processing device 210 in a recording medium such as a hard disk.

Figure 4:
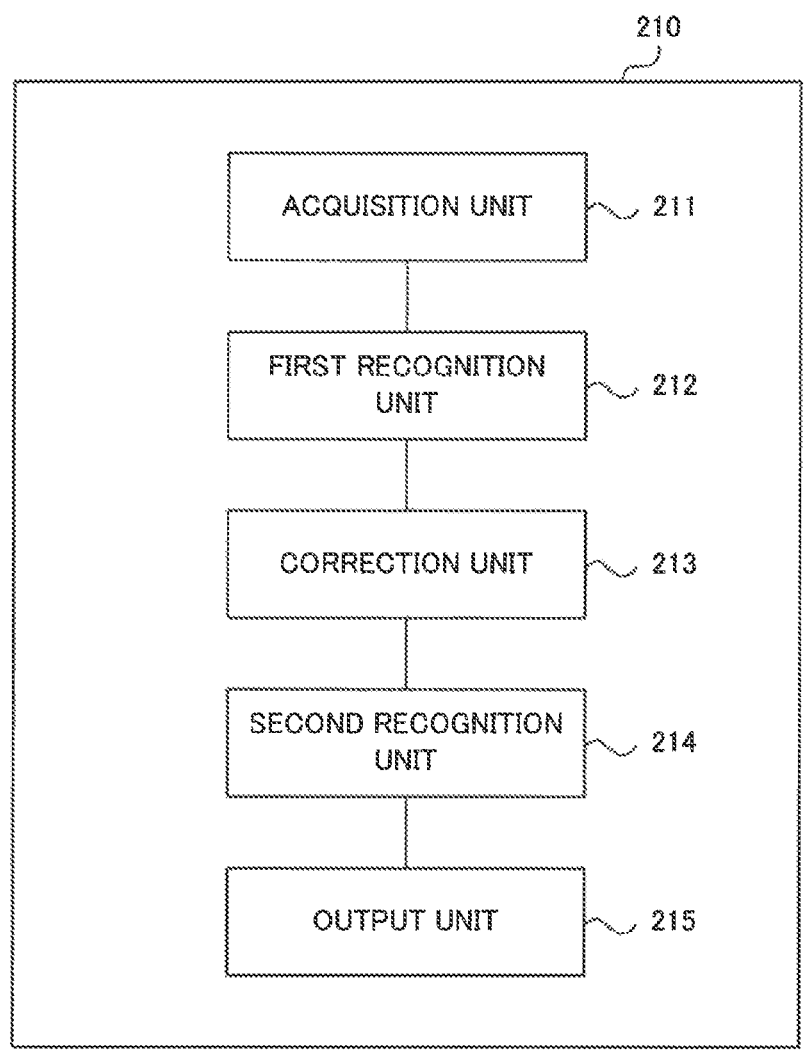
FIG. 4 is a block diagram illustrating one example of a configuration of an image processing device.

FIG. 4 is a block diagram illustrating a detailed configuration of the image processing device 210. The image processing device 210 includes an acquisition unit 211, a first recognition unit 212, a correction unit 213, a second recognition unit 214, and an output unit 215.

On the image processing device 210 of the present example embodiment, a learning algorithm of machine learning and a local feature value are not limited to particular ones. The following description concerns a typical example when a learning algorithm is Real AdaBoost and a local feature value is a local binary pattern (LBP). However, the learning algorithm and the local feature value shown herein are merely examples for carrying out the present invention, and do not limit the scope of the present invention. It is assumed that learning by samples has been previously performed, and a detailed description is omitted herein.

The acquisition unit 211 acquires image data transmitted from the photographing device 220. The acquisition unit 211 may perform, on the acquired image data, image processing corresponding to pre-processing of processing at a latter stage. For example, the acquisition unit 211 may perform image processing such as conversion of resolution, a color reduction from a color image to a gray-scale image, and enlargement, reduction, or rotation of an image.

The first recognition unit 212 computes scores (evaluation values) each indicating likelihood of a face regarding respective computation points in an image indicated by the image data acquired by the acquisition unit 211. The first recognition unit 212 is achieved specifically by a weak classifier for each of the computation points. The first recognition unit 212 sets a detection window of a predetermined range, and computes local feature values regarding a plurality of computation points of an image in the detection window. Further, the first recognition unit 212 computes a score on the basis of a computed local feature values for each of the computation points. The first recognition unit 212 corresponds to one example of the computation unit 111 in the first example embodiment.

For example, when a local feature value is an LBP, the first recognition unit 212 computes a 256-dimensional local feature value by comparing a pixel value of each point of computation with pixel values (e.g. luminance values) of eight pixels therearound. The first recognition unit 212 computes a score from the local feature value by use of a lookup table previously obtained at a stage of learning.

Hereinafter, it is assumed that a score of the present example embodiment is a larger value as likelihood of a face, i.e., likelihood of a target increases. It is also assumed that the score in the present example embodiment is 0 when being a reference value, positive when a possibility of being a face is high, and negative when a possibility of not being a face (being a non-face) is high. However, a way of setting a value of a score is not necessarily limited to this example.

The correction unit 213 selectively changes the score computed by the first recognition unit 212. The correction unit 213 changes, by a procedure described later, a score satisfying a predetermined condition among the scores, computed by the first recognition unit 212, of a plurality of computation points. In the present example embodiment, changing of a score by the correction unit 213 is referred to as a "correction". The correction unit 213 corresponds to one example of the change unit 112 in the first example embodiment.

The second recognition unit 214 detects a face on the basis of scores computed by the first recognition unit 212 and corrected by the correction unit 213. The second recognition unit 214 functions as a strong classifier for the weak classifier of the first recognition unit 212. The second recognition unit 214 corresponds to one example of the object detection unit 121 in the first example embodiment.

When Real AdaBoost is used, the second recognition unit 214 sums up scores obtained through the first recognition unit 212 and the correction unit 213, and compares the sum of the scores with a predetermined threshold. The second recognition unit 214 determines that a face is included in the image in the detection window when the added score is equal to or more than the predetermined threshold, whereas the second recognition unit 214 determines that a face is not included in the image in the detection window when the added score is less than the predetermined threshold.

The output unit 215 outputs data which depends on a determination result by the second recognition unit 214. In this instance, the output unit 215 may perform image processing on the image data acquired by the acquisition unit 211.

For example, the output unit 215 may output "1" when the second recognition unit 214 determines that a face is included in an image, whereas the output unit 215 may output "0" when the second recognition unit 214 determines that a face is not included in the image. Alternatively, the output unit 215 may visualize a detection window determined to be a face, output image data which shows the detection window superposed on an original image acquired by the acquisition unit 211. This makes it possible to indicate the determination result by the second recognition unit 214 to a user in an easily understandable manner.

Figure 5:
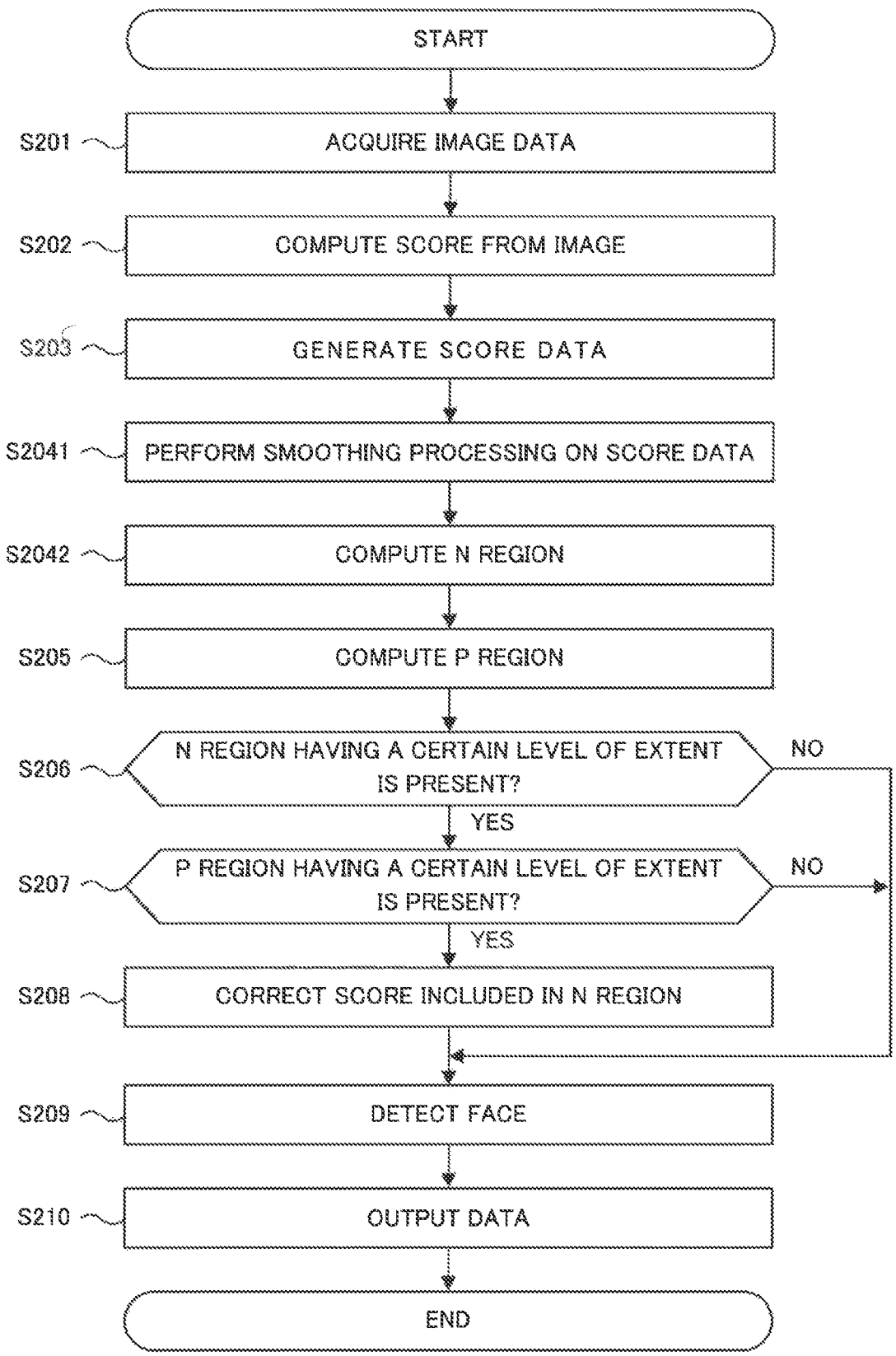
FIG. 5 is a flowchart illustrating one example of an operation of the image processing device.

FIG. 5 is a flowchart illustrating an overview of an operation of the image processing device 210. This flowchart illustrates, in particular, a procedure of a correction by the correction unit 213 in detail, out of processing performed by the image processing device 210.

In the operation illustrated in FIG. 5, the acquisition unit 211 acquires image data at an appropriate timing (step S201). A timing at which the acquisition unit 211 acquires image data is not limited to a particular timing. The first recognition unit 212 computes, by use of the image data acquired in step S201 (step S202), a score from a predetermined range (i.e. having a predetermined number of pixels) of an image thereof. The first recognition unit 212 computes scores for a plurality of computation points, as described above.

The correction unit 213 generates score data on the basis of the score computed in step S202 (step S203). The score data herein refer to data indicating a distribution of scores in an image, and data in which a pixel of a computation point is associated with a score computed on the pixel. Pixels for which scores are computed may be pixels of a part of an image rather than pixels of a whole image.

Then, the correction unit 213 performs smoothing processing (filter processing) on the score data (step S2041). On the smoothing processing, a score of a pixel for which a score has not been computed is assumed as "0". A filter used in the smoothing processing is, for example, a moving average filter or a Gaussian filter, but does not need to be limited to a particular filter.

Figure 6:
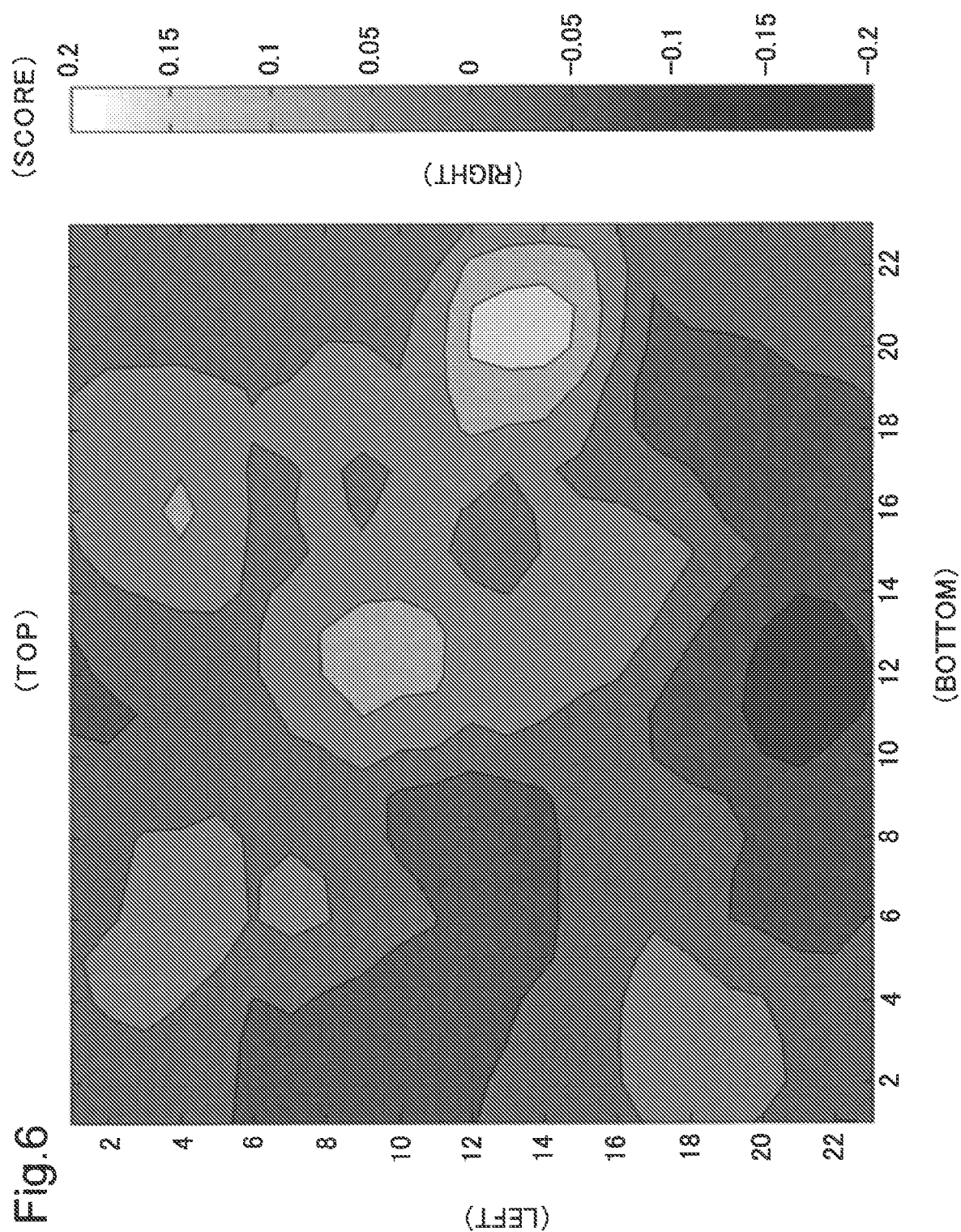
FIG. 6 is a first graph illustrating score data after filter processing by way of example.
Figure 7:
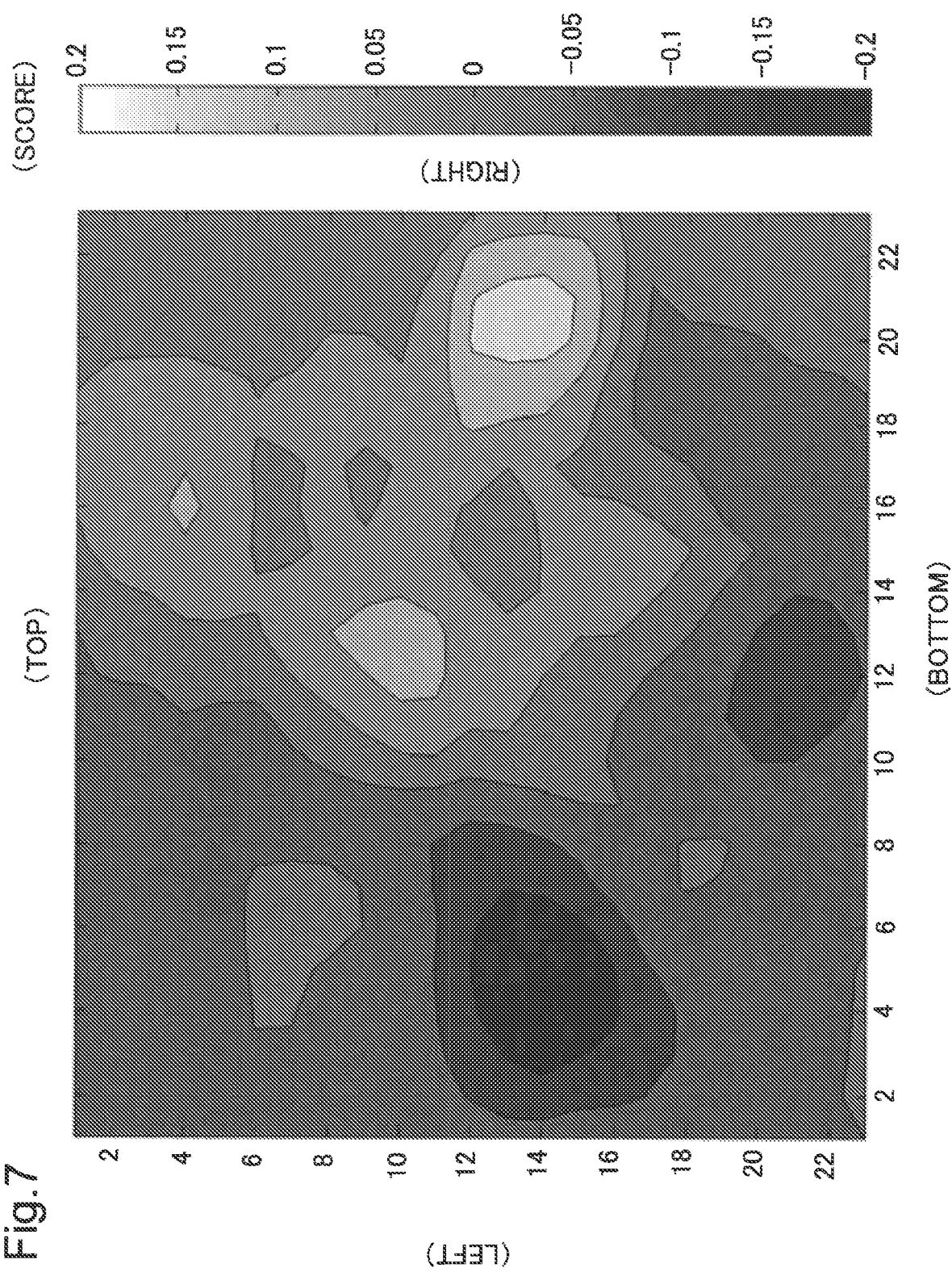
FIG. 7 is a second graph illustrating score data after filter processing by way of example.
Figure 8:
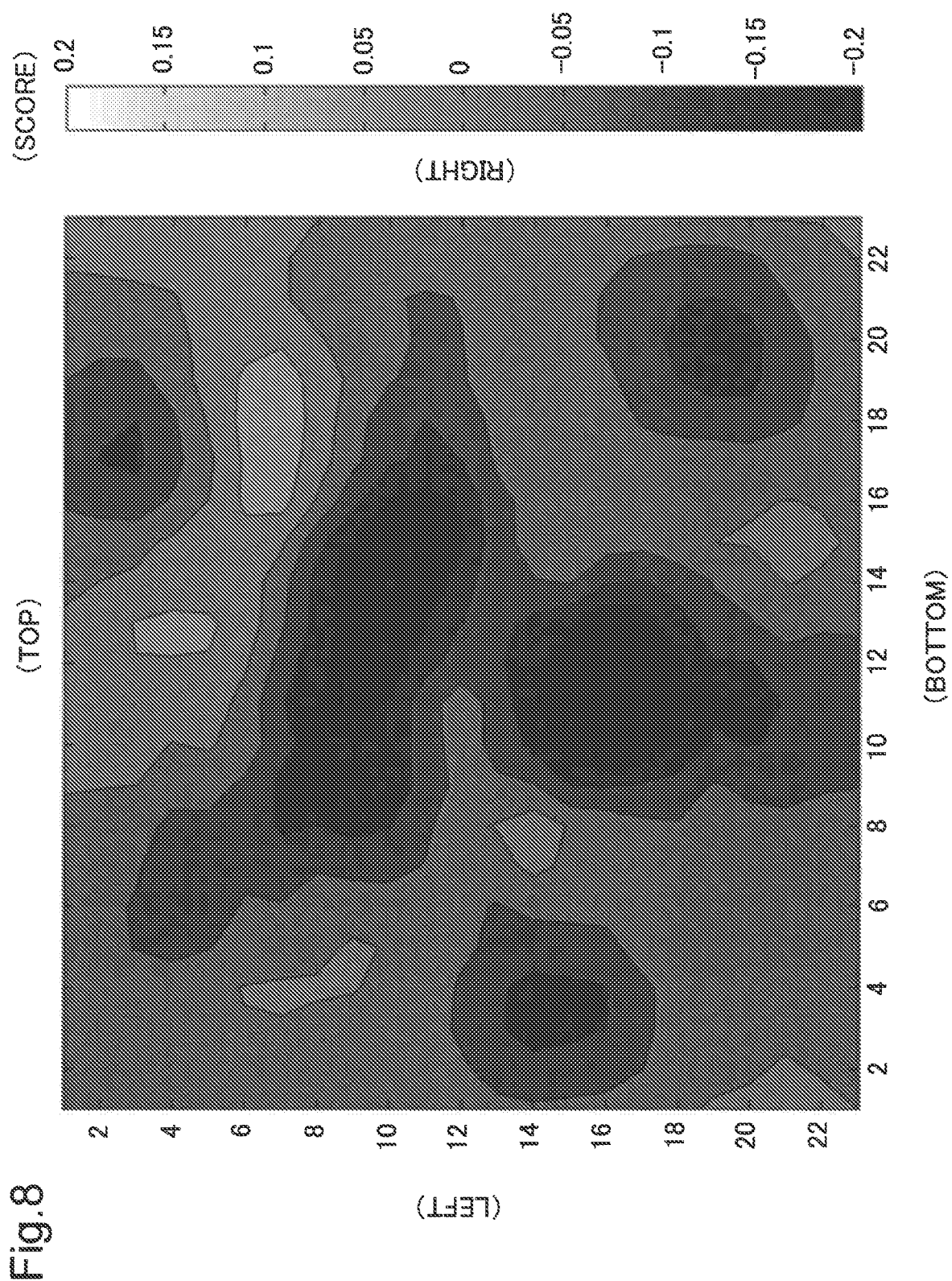
FIG. 8 is a third graph illustrating score data after filter processing by way of example.

FIGS. 6 to 8 are graphs illustrating score data after the filter processing. FIGS. 6 to 8 illustrate score data in the case where a size of a detection window is 23×23 pixels, and a range of scores is −0.2 to +0.2. FIG. 6 illustrates one example of score data generated when a face is included in an image. FIG. 7 illustrates one example of score data generated when a covered face (specifically, a face that is the same as the face for which the score data are computed in FIG. 6 with the left side of the face covered) is included in an image. FIG. 8 illustrates one example of score data generated when a face is not included in an image (in the case of an image including a non-face).

After performing the smoothing processing on the score data, the correction unit 213 computes a negative (N) region and a positive (P) region (steps S2042 and S205). The N region herein refers to a region composed of continuous pixels whose scores (after smoothing processing) are less than or equal to a first threshold (e.g. "−0.1"). In other words, the N region can also be said to be a region which does not have a feature likely to be of a face. In contrast, the P region refers to a region composed of continuous pixels whose scores (after smoothing processing) are equal to or more than a second threshold (e.g. "+0.1"). In other words, the P region can also be said to be a region which have a feature likely to be of a face. The N region corresponds to one example of the first region in the first example embodiment. The P region corresponds to one example of the second region in the first example embodiment.

The correction unit 213 determines whether or not the N region computed in step S2042 has a certain level of extent (step S206). The correction unit 213 may determine, for example, whether or not an area (i.e. the number of pixels) of the N region is equal to or more than a predetermined threshold, or whether or not an area ratio of the N region to a whole image is equal to or more than a predetermined ratio.

When N regions discretely appears, in other words, a plurality of N regions appear in an image, the correction unit 213 may compare an extent of the individual N region with a threshold, or compare, with a threshold, the sum of extents of the plurality of N regions. In the former case, the correction unit 213 may count only an N region whose extent is equal to or more than the threshold as a target for a correction, and exclude an N region whose extent is less than the threshold from a target for a correction.

When an N region having a certain level of extent is present (step S206: YES), the correction unit 213 determines whether or not the P region computed in step S205 has a certain level of extent (step S207). The determination in step S207 is made in a manner similar to the determination in step S206. However, the threshold used for determination may differ between steps S206 and S207.

When an N region having a certain level of extent and a P region having a certain level of extent are present (S207: YES), the correction unit 213 corrects a score of a computation point belonging to an N region (step S208). On the other hand, when at least either the N region or the P region does not have a certain level of extent (S206: NO and/or S207: NO), the correction unit 213 skips the processing in step S208. In other words, the correction unit 213 performs a correction when both an N region and a P region each having a certain degree of extent are present. Otherwise, the correction unit 213 does not perform a correction.

Each of four methods shown below, for example, is applicable as a correction method of a score in step S208. A first method is a method which adds a certain value (e.g. "+0.1" or "+0.15") to a score of a computation point included in an N region. A second method is a method which changes a score of a computation point included in an N region to a certain value (e.g. "0" or "+0.1"). A third method is a method which changes a score of a computation point included in an N region to a predetermined value determined for the computation point (i.e. for its position). A fourth method is a method which determines a correction amount of a score of a computation point included in an N region according to a score of a region other than the N region.

The third method, for example, converts a score of a computation point included in an N region of an image to a typical value which is computed when the image includes a face. Such a value may be experimentally or experientially obtained in advance on the basis of a sample or the like used for learning.

The fourth method, for example, increases a correction amount when an average value of scores of computation points included in a P region is high, and decreases a correction amount when the average value is low. This is because there is a high possibility that a face is included in an image in which an average value of scores of computation points included in a P region is high. It can be said that there is a high possibility that an N region appearing in such a case is a covered region.

In any of the methods, it is sufficient when a corrected score is a value that has been changed in such a way as to result in an increase in likelihood of a target. For example, in the present example embodiment, it is sufficient for an operation of the correction unit 213 to add a certain positive value to a score. The individual score does not necessarily need to be changed to a value equal to or more than the second threshold at a time of a correction.

According to the first method or the second method, it is not necessary to compute a correction value for each computation point, and processing can therefore be made simple. In contrast, according to the third method, it is possible, whether or not a face is included in an image, to perform a more accurate determination than that in the case where the first method or the second method is used.

Not all scores of the computation points belonging to an N region are necessarily less than or equal to the first threshold. This is because the N region referred to herein is a region determined on the basis of score data generated after smoothing processing. Therefore, there is a possibility that a computation point whose score may be higher than the first threshold belongs to the N region due to scores of pixels therearound. The correction unit 213 may include or not include, in a target for a correction, such a computation point, i.e., "a computation point which is included in an N region but whose score is larger than the first threshold". In other words, the correction unit 213 may correct scores of all computation points included in an N region, or correct only part of the computation points included in the N region.

The processing performed by the correction unit 213 is as described above. Hereinafter, the processing in steps S203 to S208 is referred to as "correction processing". The order of some of the steps may be modified in the correction processing. For example, the determinations in steps S206 and S207 may be in reverse order, or may be performed in parallel (i.e. simultaneously).

The second recognition unit 214 attempts detection of a face, by using a correction result by the correction processing (step S209). In other words, the second recognition unit 214 uses the score computed by the first recognition unit 212 as it is, for a computation point included in a P region, and a computation point that is not included in either the P region or an N region. The second recognition unit 214 uses the score corrected by the correction unit 213, for a computation point included in the N region. Thereafter, the output unit 215 outputs data which depends on a determination result by the second recognition unit 214 (step S210).

The image processing device 210 may repeatedly perform the processing illustrated in FIG. 5 while changing a position and/or a size of a detection window. Moreover, the image processing device 210 may repetitively receive image data from the photographing device 220, and perform the processing illustrated in FIG. 5 for each piece of the image data.

According to the image processing system 200 described above, it is possible to make it easier to, when a part of a face is covered, detect the face by raising a score of a computation point included in an N region. The inventor of the present invention has focused attention on a fact that a certain tendency different from that of an "image which does not include a face" appears in an "image which includes a face but which is partly covered (hereinafter referred to as an "occlusion image")". On the basis of this tendency, the inventor of the present invention has enabled a highly accurate differentiation between both the images. The tendency is that not only an N region but both the N region and a P region are present at a certain proportion or more in an occlusion image.

As illustrated in FIG. 8, an image which does not include a face is low in a score of a computation point as a whole, and most of the image belongs to an N region. In contrast, an occlusion image forms a tendency that a covered region belongs to an N region and a non-covered region belongs to a P region as illustrated in FIG. 7, which is a different tendency from a tendency on the image that does not include a face. In other words, an occlusion image is the similar to an image which does not include a face in that it includes an N region, but is different from an image which does not include a face in terms of a distribution of the N region and a ratio between the N region and a P region. By determining whether or not a score can be corrected on the basis of such a tendency, the image processing device 210 makes it easier to detect a face from an occlusion image, and yet makes it possible to suppress a correction of a score of an image which does not include a face.

The image processing device 210 can detect a face by reducing an influence of a covering object irrespective of a specific position of the covering object. Thus, according to the image processing device 210, even when a covering object which covers a face is not an object present at a particular position, it is possible to reduce an influence of the covering object. For example, whether a user's mouth is hidden behind a mask (surgical mask) or a user's eyes are hidden behind sunglasses, the image processing device 210 can perform processing with the same algorithm. A covering object over a face is not limited to an object which a user attaches to his/her face, and may be, for example, his/her hand or hair.

[Modifications]

An example embodiment of the present invention is not limited solely to the example embodiment described above.

An example embodiment of the present invention can include, for example, modifications described below. Moreover, an example embodiment of the present invention may be achieved by combining as needed the example embodiments and modifications described in the present description. For example, a modification described by use of a particular example embodiment is also applicable to other example embodiments.

(Modification 1)

At a time of a correction, the correction unit 213 may change a score of a computation point included in an N region to an invalid value. An invalid value herein refers to a value which does not affect the determination in the second recognition unit 214. Alternatively, the second recognition unit 214 may determine whether or not a face is included in an image, by use of a score other than an invalid score. Therefore, in this case, the correction unit 213 can reduce the number of scores used for the determination performed by the second recognition unit 214. In the example described above, i.e., when a score takes a positive or negative value depending on likelihood of a face, the correction unit 213 may change a score of a computation point included in the N region to "0".

(Modification 2)

In the determination in step S206 (or S207) (see FIG. 5), the correction unit 213 may determine whether or not to perform a correction, on the basis of not only an extent of an N region (or a P region) but also scores of computation points in the region. For example, in step S206, the correction unit 213 may compute an index determined according to an extent of the N region and scores of computation points in the region, and perform a correction when the computed index is equal to or more than a predetermined threshold. The index is a product of an area of the N region and an average value of scores of computation points included in the N region.

(Modification 3)

The correction unit 213 may combine scores of computation points with another determination criteria and perform a correction. One of known object detection algorithms, for example, is applicable for another determination criteria referred to herein.

For example, the correction unit 213 may further have a function of detecting a feature point typical of a target. When a target is a face, the feature point referred to herein is an eye, an eyebrow, a part between eyebrows, a nose, an end point or a center of a mouth, and the like. Hereinafter, a feature point typical of a face is referred to as a "face feature point".

A face feature point has a certain degree of individual difference, but has a certain tendency of a positional relation. For example, a face feature point corresponding to a mouth is located below a face feature point corresponding to a nose. A face feature point corresponding to a right eye and a left eye is located above a face feature point corresponding to a nose. However, it is assumed herein that a face is not directed sideways or backwards.

When a face feature point for a predetermined position is detected at the predetermined position, it can be said that there is a high possibility that a face is included in an image. In this case, when a P region and an N region are included in the image, it can be said that there is a high possibility that this image is an image in which a part of a face (not a non-face) is covered. When a face feature point is detected in the P region, there is a higher possibility that a face is included in the image.

The correction unit 213 attempts detection of a face feature point at a predetermined position of the image. The correction unit 213 performs detection of a face feature point at several representative positions (a right eye, a left eye, a part between eyebrows, a nose, a mouth, and the like). For example, when face feature points whose number is equal to or more than a predetermined number are detected, the correction unit 213 may further correct a score of a computation point included in the P region in such a way that likelihood of a face increases. When face feature points equal to or more than a predetermined number are not detected, the correction unit 213 may further correct a score of a computation point included in the P region in such a way that likelihood of a face decreases. In this way, a determination is performed not only on the basis of presence of the P region and the N region but also on the basis of likelihood of a face, and it is therefore possible to more accurately differentiate between a face and a non-face when the P region and the N region are present.

(Modification 4)

An example embodiment of the present invention can include a so-called cascaded detector (classifier). A cascaded detector herein refers to a classifier which detects a target by linking together a plurality of classifiers in series.

Figure 9:
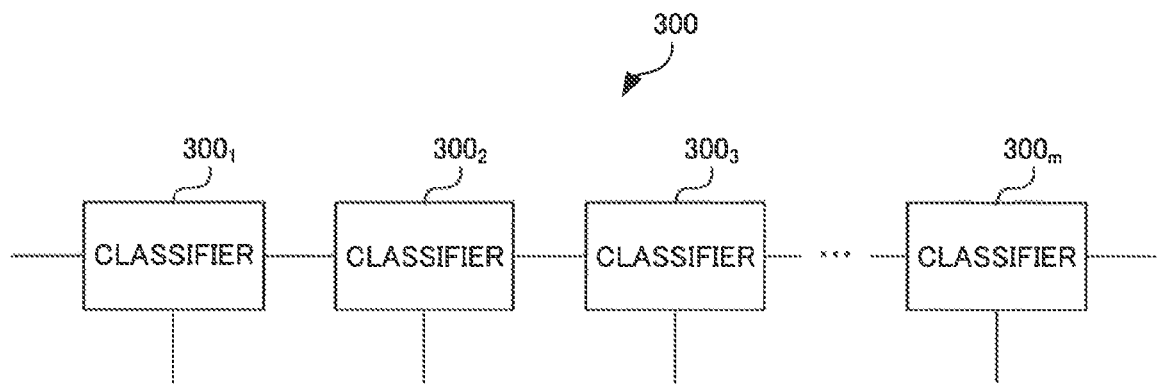
FIG. 9 is a block diagram illustrating one example of a configuration of a cascaded detector.

FIG. 9 is a block diagram illustrating a configuration of a cascaded detector 300 according to another example embodiment of the present invention. The cascaded detector 300 includes classifiers $300_1, 300_2, 300_3, \ldots, 300_m$. A value of m is not limited to a particular value.

At least one of the classifiers $300_1$ to $300_m$ has a function equivalent to that of the image processing system 100 according to the first example embodiment or the image processing device 210 according to the second example embodiment. It is assumed herein that all of the classifiers $300_1$ to $300_m$ have a function equivalent to that of the image processing system 100 or the image processing device 210. The classifiers $300_1$ to $300_m$ are configured to be different in position and size for weak classifiers, respectively. The classifiers $300_1$ to $300_m$ are configured, for example, to be higher in speed but have more detection errors as their stage goes further to a former stage, and to be higher in detection accuracy as a stage goes further to a latter stage.

The cascaded detector 300 repeats processing of inputting an image in which a target has been detected by a classifier at a former stage (e.g. the classifier $300_1$) to a classifier at a latter stage (the classifier $300_2$) and determining whether or not the target is present. The cascaded detector 300 determines that a target is included in an image when a target has been detected by all of the classifiers $300_1$ to $300_m$.

It is difficult for the cascaded detector 300 to compute an N region (a first region) and a P region (a second region) in a classifier at a former stage because the number of weak classifiers therein is small. However, after repeating detection of a target, the cascaded detector 300 soon becomes able to compute an N region and a P region.

The cascaded detector 300 computes an N region and a P region with a classifier at a certain stage. When these regions satisfy predetermined conditions (see steps S206 and S207 in FIG. 5), the cascaded detector 300 corrects a score in the classifier. Alternatively, the cascaded detector 300 may be configured to compute an N region and a P region in a classifier at a certain stage, and correct a score in a latter classifier subsequent to the classifier when those regions satisfy predetermined conditions.

(Modification 5)

A score computed for each computation point does not necessarily need to be a numerical value. The score may indicate likelihood of a target gradually by means of the alphabet, for example, A, B, C, . . . . In regard to likelihood of a target indicated by a score, when there are ten ranks of scores 1 to 10, for example, "1" may be a maximum, or "10" may be a maximum.

(Modification 6)

The image processing system 200 according to the second example embodiment is also applicable to a target other than a face, like the image processing system 100 according to the first example embodiment. However, details of an algorithm used for detection of a target can vary depending on the target.

A local feature value is not limited to an LBP. A local feature value used to compute a score may be, for example, one of the following feature value:

Haar-like feature value [Viola04]; and

Histograms of oriented gradients (HOG) feature value [Dalal05].

Furthermore, a learning algorithm of machine learning is not limited to Real AdaBoost. As a learning algorithm of machine learning, ensemble learning using a classifier having a tree structure can be used in addition to boosting in general, and examples of algorithms which may be used are as follows:

AdaBoost;

LogitBoost;

Gentle AdaBoost; and

Random Forests.

(Modification 7)

As for specific hardware configurations of the devices described in the first example embodiment and the second example embodiment, variations are conceivable, and the hardware configuration is not limited to a particular configuration. For example, the information processing devices 110 and 120 according to the first example embodiment may be achieved by a single device. Further, the image processing device 210 according to the second example embodiment may be achieved by a plurality of devices. The individual devices included in these example embodiments may be connected in either wired or wireless manner, or may be connected via a network.

Figure 10:
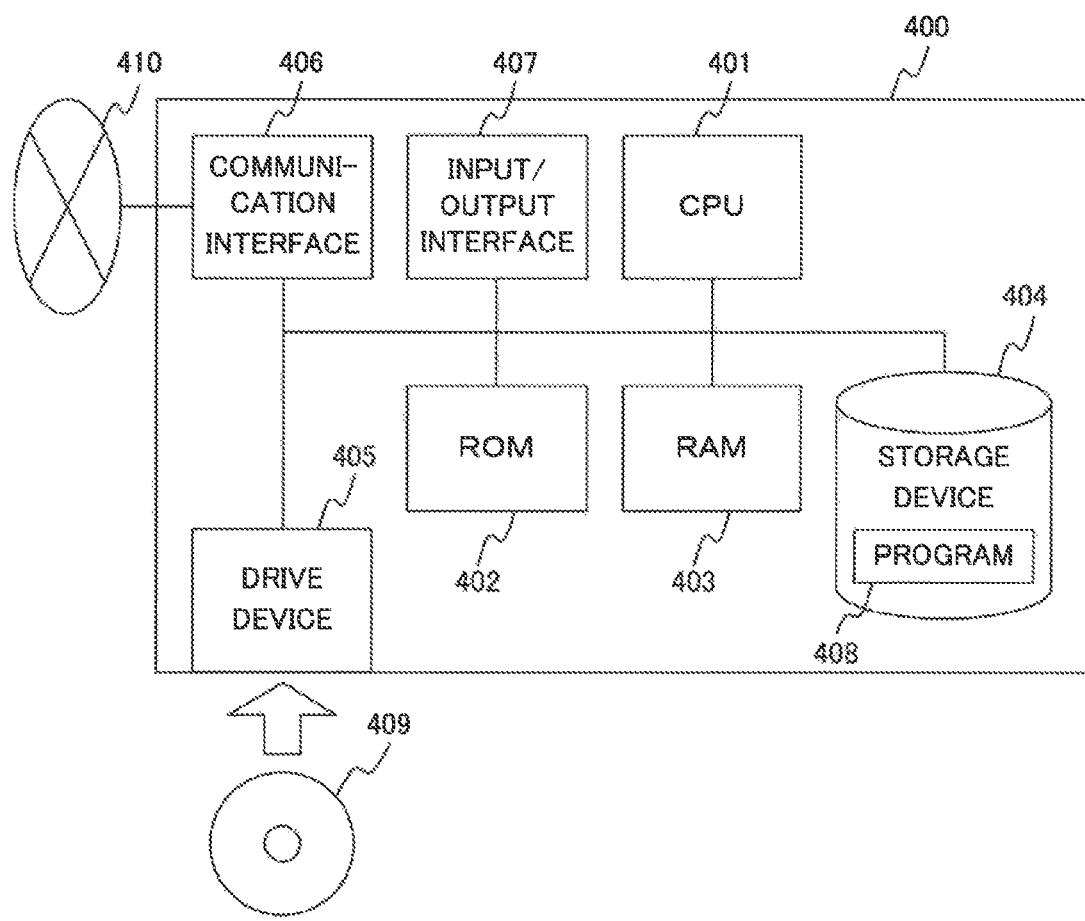
FIG. 10 is a block diagram illustrating one example of a hardware configuration of a computer device.

FIG. 10 is a block diagram illustrating a hardware configuration of a computer device 400 that achieves the information processing devices 110 and 120 or the image processing device 210. The computer device 400 includes a central processing unit (CPU) 401, a read only memory (ROM) 402, a random access memory (RAM) 403, a storage device 404, a drive device 405, a communication interface 406, and an input/output interface 407.

The CPU 401 executes a program 408 by use of the RAM 403. The program 408 may be stored in the ROM 402. The program 408 may be recorded in a recording medium 409 and read by the drive device 405, or may be transmitted from an external device via a network 410. The communication interface 406 exchanges data with an external device via the network 410. The input/output interface 407 exchanges data with a peripheral device (a keyboard, a mouse, a display device, and the like). The communication interface 406 and the input/output interface 407 may function as means for acquiring and outputting data.

Some or all of the components of the information processing devices 110 and 120 or the image processing device 210 may be achieved by a general-purpose or dedicated circuit, a processor or the like, or a combination of them. For example, a component related to image processing may be a graphics processing unit (GPU) or an application specific integrated circuit (ASIC). The components of the information processing devices 110 and 120 or the image processing device 210 may be achieved by a single chip, or may be achieved by a plurality of chips. Some or all of the components of the information processing devices 110 and 120 or the image processing device 210 may be achieved by a combination of the aforementioned circuit or the like and a program.

[Supplementary Notes]

All or part of the example embodiments described above may be described as in the following supplementary notes, but the present invention is not limited thereto.

(Supplementary Note 1)

An information processing device comprising:

computation means for computing local scores each indicating likelihood of a detection target, for a plurality of positions included in an image of a predetermined range; and change means for changing a score of a position among the plurality of positions in such a way that the likelihood of the detection target increases, the position being included in a prescribed region determined depending on a plurality of computed scores.

(Supplementary Note 2)

The information processing device according to Supplementary Note 1, wherein the change means changes the score, based on a distribution of a first region in the image, the first region being determined depending on one or more positions where scores are less than or equal to a first threshold among the plurality of positions.

(Supplementary Note 3)

The information processing device according to Supplementary Note 2, wherein the change means changes the score, based on a distribution of the first region and a second region in the image, the second region being determined depending on one or more positions where scores are more than or equal to a second threshold being higher than the first threshold among the plurality of positions.

(Supplementary Note 4)

The information processing device according to Supplementary Note 3, wherein the change means changes the score, based on an area or a ratio of the first region or the second region in the image, the first region being determined depending on one or more positions where scores are less than or equal to a first threshold among the plurality of positions in the image, the second region being determined depending on one or more positions where scores are more than or equal to a second threshold being higher than the first threshold among the plurality of positions.

(Supplementary Note 5)

The information processing device according to Supplementary Note 4, wherein the change means changes the score, based on the area or the ratio, and scores of at least either positions included in the first region or positions included in the second region among the plurality of positions.

(Supplementary Note 6)

The information processing device according to any one of Supplementary Notes 1 to 5, wherein the change means adds a certain value to at least one of one or more scores of one or more positions included in the prescribed region.

(Supplementary Note 7)

The information processing device according to any one of Supplementary Notes 1 to 5, wherein the change means changes at least one of one or more scores of positions included in the prescribed region to a certain value.

(Supplementary Note 8)

The information processing device according to any one of Supplementary Notes 1 to 5, wherein the change means changes a score of a position included in the prescribed region among the plurality of positions, based on the position.

(Supplementary Note 9)

The information processing device according to any one of Supplementary Notes 1 to 5, wherein the change means changes a score of a position included in the prescribed region among the plurality of positions, based on one or more scores of one or more positions outside the prescribed region.

(Supplementary Note 10)

The information processing device according to any one of Supplementary Notes 3 to 5, further comprising feature point detection means for detecting a feature point at a prescribed position which is based on the detection target in the image, wherein the change means changes a score of a position included in the second region among the plurality of positions, based on the detected feature point.

(Supplementary Note 11)

The information processing device according to any one of Supplementary Notes 1 to 10, further comprising object detection means for detecting the detection target, based on the computed scores and the changed score.

(Supplementary Note 12)

The information processing device according to Supplementary Note 11, wherein the change means changes a score of a position included in the first region among the plurality of positions to a value being invalid at detection by the object detection means.

(Supplementary Note 13)

An image processing system comprising:

computation means for computing local scores each indicating likelihood of a detection target, for a plurality of positions included in an image within a predetermined range;

change means for changing a score of a position among the plurality of positions in such a way that the likelihood of the detection target increases, the position included in a prescribed region determined depending on a plurality of computed scores; and object detection means for detecting the detection target based on the computed scores and the changed score.

(Supplementary Note 14)

An image processing method comprising:

computing local scores each indicating likelihood of a detection target, for a plurality of positions included in an image within a predetermined range;

changing a score of a position among the plurality of positions in such a way that the likelihood of the detection target increases, the position being included in a prescribed region determined depending on a plurality of computed scores; and detecting the detection target based on the computed scores and the changed score.

(Supplementary Note 15)

A computer-readable program storage medium storing a program for causing a computer to execute:

processing of computing local scores each indicating likelihood of a detection target, for a plurality of positions included in an image within a predetermined range; and processing of changing a score of a position among the plurality of positions in such a way that the likelihood of the detection target increases, the position being included in a prescribed region determined depending on a plurality of computed scores.

The present application claims the benefits of priority based on Japanese Patent Application No. 2015-199081, filed on Oct. 7, 2015, the entire disclosure of which is incorporated herein by reference.

REFERENCE SIGNS LIST 100, 200 image processing system
110, 120 information processing device
111 computation unit
112 change unit
121 object detection unit
210 image processing device
211 acquisition unit
212 first classification unit
213 correction unit
214 second classification unit
215 output unit
220 photographing device
230 monitor device
300 cascaded detector
400 computer device

The invention claimed is:

1. An image processing system comprising:
at least one memory storing instructions; and
at least one processor coupled to the at least one memory, the at least one processor being configured to execute the instructions to:
perform a plurality of weak classifications on a plurality of positions in an image, each of the plurality of weak classifications comprising computing a local feature value with regard to one of the plurality of positions and computing a local score indicating likelihood of a face by using an algorithm for evaluation of the likelihood of a face based on the computed local feature value;
perform correction processing of correcting at least one of scores computed by the plurality of weak classifications on the plurality of positions;
perform determination of whether a face is included in the image based on a result of comparison between a predetermine threshold value and a value calculated from post-correction scores which are obtained through the correction processing; and
output a result of the determination,
wherein the correction processing comprises:
smoothing processing comprising smoothing score data which indicates a distribution of the scores of the plurality of positions;
determining whether a first region whose extent is over a first criterion exist in the smoothed score data, the first region being a region composed of continuous pixels whose scores are less than or equal to a first threshold;
determining whether a second region whose extent is over a second criterion exist in the smoothed score data, the second region being a region composed of continuous pixels whose scores are more than or equal to a second threshold; and
changing at least one of the scores of the plurality of positions in such a way that the likelihood of a face increases when both the first region whose extent is over the first criterion and the second region whose extent is over the second criterion exist in the smoothed score data.

2. The image processing system according to claim 1, wherein
the changing comprises increasing all or part of scores of positions in the first region.

3. The image processing system according to claim 1, wherein
the changing comprises changing all or part of scores of positions in the first region a value that does not affect the determination.

4. The image processing system according to claim 1, wherein the at least one processor is further configured to
perform the plurality of weak classifications with a cascaded detector which includes a plurality of classifiers linked together in series.

5. An image processing method comprising:
performing a plurality of weak classifications on a plurality of positions in an image, each of the plurality of weak classifications comprising computing a local feature value with regard to one of the plurality of positions and computing a local score indicating likelihood of a face by using an algorithm for evaluation of the likelihood of a face based on the computed local feature value;
performing correction processing of correcting at least one of scores computed by the plurality of weak classifications on the plurality of positions;
performing determination of whether a face is included in the image based on a result of comparison between a predetermine threshold value and a value calculated from post-correction scores which are obtained through the correction processing; and
outputting a result of the determination,
wherein the correction processing comprises:
smoothing processing comprising smoothing score data which indicates a distribution of the scores of the plurality of positions;
determining whether a first region whose extent is over a first criterion exist in the smoothed score data, the first region being a region composed of continuous pixels whose scores are less than or equal to a first threshold;
determining whether a second region whose extent is over a second criterion exist in the smoothed score data, the second region being a region composed of continuous pixels whose scores are more than or equal to a second threshold; and
changing at least one of the scores of the plurality of positions in such a way that the likelihood of a face increases when both the first region whose extent is over the first criterion and the second region whose extent is over the second criterion exist in the smoothed score data.

6. The image processing method according to claim 5, wherein
the changing comprises increasing all or part of scores of positions in the first region.

7. The image processing method according to claim 5, wherein
the changing comprises changing all or part of scores of positions in the first region a value that does not affect the determination.

8. The image processing method according to claim 5, wherein
the plurality of weak classifications are performed with a cascaded detector which includes a plurality of classifiers linked together in series.

9. A non-transitory computer-readable storage medium storing a program that causes a computer to perform:
a plurality of weak classifications on a plurality of positions in an image, each of the plurality of weak classifications comprising computing a local feature value with regard to one of the plurality of positions and computing a local score indicating likelihood of a face by using an algorithm for evaluation of the likelihood of a face based on the computed local feature value;
correction processing of correcting at least one of scores computed by the plurality of weak classifications on the plurality of positions;
determination of whether a face is included in the image based on a result of comparison between a predetermine threshold value and a value calculated from post-correction scores which are obtained through the correction processing; and
outputting a result of the determination,
wherein the correction processing comprises:
smoothing processing comprising smoothing score data which indicates a distribution of the scores of the plurality of positions;
determining whether a first region whose extent is over a first criterion exist in the smoothed score data, the first region being a region composed of continuous pixels whose scores are less than or equal to a first threshold;
determining whether a second region whose extent is over a second criterion exist in the smoothed score data, the second region being a region composed of continuous pixels whose scores are more than or equal to a second threshold; and
changing at least one of the scores of the plurality of positions in such a way that the likelihood of a face increases when both the first region whose extent is over the first criterion and the second region whose extent is over the second criterion exist in the smoothed score data.

10. The storage medium according to claim 9, wherein
the changing comprises increasing all or part of scores of positions in the first region.

11. The storage medium according to claim 9, wherein
the changing comprises changing all or part of scores of positions in the first region a value that does not affect the determination.

12. The storage medium according to claim 9, wherein
the plurality of weak classifications are performed with a cascaded detector which includes a plurality of classifiers linked together in series.

* * * * *